July 12, 1960    H. T. HALL    2,944,289
REACTION VESSEL
Filed Aug. 18, 1955
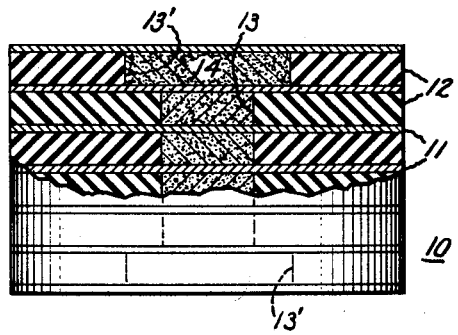
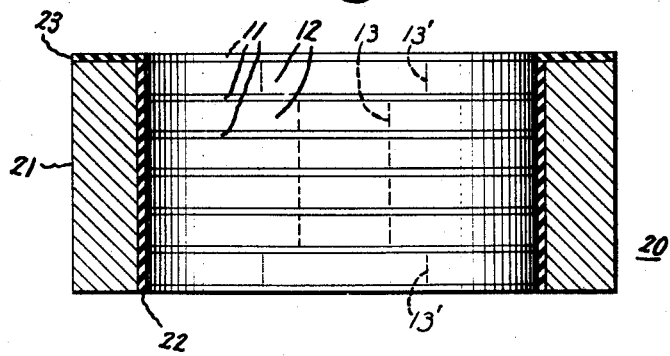
Inventor:
Howard Tracy Hall,
by Paul A. Frank
His Attorney.

United States Patent Office 2,944,289
Patented July 12, 1960

2,944,289

REACTION VESSEL

Howard Tracy Hall, Niskayuna, N.Y., assignor to General Electric Company, a corporation of New York Filed Aug. 18, 1955, Ser. No. 529,100

4 Claims. (Cl. 18—34)

My invention relates to reaction vessels and more particularly to such vessels which are subjected to high pressure and high temperature conditions.

In high pressure apparatus, a reaction vessel extrudes laterally from between opposed flat-faced pressure members when pressures of the order of 40,000 to 100,000 atmospheres are applied to the vessel. Previously, pressure members of special construction were used to overcome partially this problem. However, it is desirable to employ a high pressure apparatus having flat-faced pressure members. The invention of the present application provides a novel reaction vessel which reduces lateral extrusion of material when the vessel is subjected to the above high pressure conditions in conventional high pressure apparatus.

Accordingly, it is an object of my invention to provide a new and improved reaction vessel.

It is another object of the invention to provide an improved reaction vessel which may be subjected to high pressures and temperatures.

It is a further object of the invention to provide an improved reaction vessel which may be subjected in a high pressure apparatus to a large compressive force without excessive lateral extrusion of material from between opposed pressure members.

In carrying out my invention in one form, a plurality of thermally and electrically insulating and pressure resisting washers are stacked alternately in coaxial contiguous relationship with a plurality of electrically conductive discs to provide a reaction vessel which is adapted to contain a specimen for subjection to high pressure and high temperature conditions.

These and various other objects, features and advantages of the invention will be better understood from the following description taken in connection with the accompanying drawing in which:

Fig. 1 is a partial sectional view of a reaction vessel which embodies my invention; and Fig. 2 is a partial sectional view of a modified reaction vessel.

In Fig. 1 of the drawing, a reaction vessel 10 is shown which comprises a plurality of electrically conductive discs 11 with a thermally and electrically insulating and pressure resisting washer 12 between each of discs 11. Discs 11 are composed of suitable materials, such as, metal or graphite while washers 12 are made of pyrophyllite or catlinite. Each washer 12 is provided with a central aperture 13 which is adapted to contain an electrically conductive specimen 14 to be subjected to high pressure and high temperature conditions. Adjacent discs 11 and washers 12 may be joined together by an adhesive, such as, waterglass cement. I have also found that maximum pressures are secured when vessel 10 has a diameter of the order of several times its axial thickness.

Reaction vessel 10 is assembled by stacking alternately a plurality of washers 12 with a plurality of discs 11, a disc 11 being employed as the end members of the stack. After each washer 12 is placed on a disc 11, aperture 13 is filled with specimen 14. Adjacent discs and washers may then be glued together to provide a more compact vessel. Thus, each aperture 13 provides a separate specimen chamber. Reaction vessel 10 is subjected to high pressure and high temperature conditions in conventional high pressure apparatus, such as, a hydraulic press in which heating means are provided. An electrical circuit is established from a source of power in the press through outer discs 11 to generate heat in specimens 14. I have found that greater heat is developed in specimens 14 in the middle portion of vessel 10 when outermost apertures 13' have the largest diameters. Compressive forces of the order of 40,000 to 100,000 atmospheres have been applied to vessel 10 without excessive lateral extrusion of the vessel from the press.

As is best shown in Fig. 2, a modified reaction vessel 20 comprises a plurality of discs 11 with an insulating washer 12 between each of these discs to provide a stacked assembly. A soft metal ring 21 surrounds this assembly to provide additional lateral support. When an electrical current is passed through vessel 20 to heat specimen 14, an insulating ring 22 is located between the assembly and ring 21. An additional ring 23 of insulating material is also provided on at least one edge of ring 21. Both discs 11 and washers 12 are assembled in the same manner as set forth in the description of Fig. 1. Rings 21, 22 and 23, which may comprise a single unit, are then slipped over the outer periphery of the stacked assembly to provide reaction vessel 20. If it is desired, either vessel 10 or 20 may be subjected to high pressures alone.

When the reaction vessel of this invention as illustrated in Figs. 1 and 2 is placed between the aforementioned flat-faced pressure members of a suitable press with the flat-faced members or anvils in contact with the flat face of the discs 13, the reaction vessel may be subjected to extremely high forces which cause substantial vertical deformation or flattening without a corresponding high degree of lateral extrusion.

As will be apparent to those skilled in the art, the objects of my invention are attained by the use of a plurality of conductive discs with an insulating washer between each disc to provide a reaction vessel for subjection to high temperature and high pressure conditions.

While other modifications of this invention and variations of apparatus have not been described, the invention is intended to include all such as may be embraced within the following claims.

What I claim as new and desire to secure by Letters Patent of the United States is:

1. A reaction vessel for subjection to high pressure with limited lateral extrusion comprising a plurality of metal discs, a plurality of pressure resisting stone washers positioned between adjacent conductive discs, said discs and washers arranged in contiguous coaxial relationship, each of said washers having a central aperture adapted to contain a specimen.

2. A reaction vessel comprising in coaxial contiguous relationship, a plurality of electrically conductive discs, a plurality of thermally and electrically insulating and pressure resisting washers positioned between adjacent conductive discs, each of said washers having a central aperture adapted to contain a specimen, each of the outer washers provided with a larger diameter aperture than the remaining washers, and an electrically conductive disc to cover each surface of said outer washers.

3. A reaction vessel for subjection to high pressure with limited lateral extrusion comprising a plurality of electrically conductive discs, a plurality of thermally and electrically insulating and pressure resisting washers positioned between adjacent conductive discs, said discs and washers being in coaxial contiguous relationship, each of said washers having a central aperture adapted to contain an electrically conductive specimen, a layer of insulation surrounding said discs and said washers, and a pressure resisting member around the periphery of said insulating layer.

4. A reaction vessel comprising in stacked relationship a plurality of electrically conductive discs, a plurality of thermally and electrically insulating and pressure resisting washers positioned between adjacent conductive discs, each of said washers having a central aperture adapted to contain an electrically conductive specimen, a layer of insulation around said discs and said washers, a pressure resisting member around the periphery of said insulating layer, and an insulating ring on at least one outer edge of said pressure resisting member.

References Cited in the file of this patent

UNITED STATES PATENTS 2,544,414 Bridgman _____ Mar. 6, 1951

FOREIGN PATENTS 122,224 Australia _____ Sept. 6, 1946

OTHER REFERENCES

Parsons: "Phil. Trans. of Royal Society," vol. 220 (A), pp. 67–75, 85–87, 92–101 (1919).

Gunther et al.: "Z. anorg. allgem. Chem.," vol. 250, pp. 357–372 (1943).

Bridgman et al.: "J. Chem. Physics," vol. 15, pp. 92–98 (February 1947).

Bridgman: "Reviews of Modern Physics," vol. 18, No. 1, p. 32, January 1946.